UNITED STATES PATENT OFFICE.

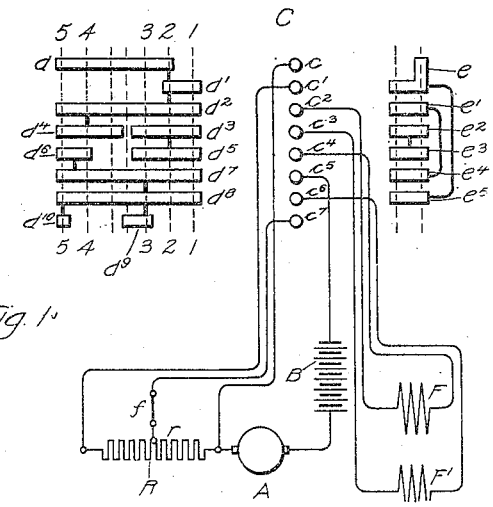

ALEXANDER CHURCHWARD, OF SCHENECTADY, NEW YORK, ASSIGNOR TO GENERAL ELECTRIC COMPANY, A CORPORATION OF NEW YORK.

PROTECTIVE DEVICE FOR AUTOMOBILE-MOTORS.

No. 835,401.     Specification of Letters Patent.     Patented Nov. 6, 1906.

Application filed June 12, 1905. Serial No. 264,745.

*To all whom it may concern:*

Be it known that I, ALEXANDER CHURCHWARD, a citizen of the United States, residing at Schenectady, county of Schenectady, State of New York, have invented certain new and useful Improvements in Protective Devices for Automobile-Motors, of which the following is a specification.

The present invention relates to control apparatus for electric motors, and particularly motors used for driving automobiles.

In Patent No. 811,533, granted on February 6, 1906, on an application filed by Edward H. Anderson, there is disclosed a system of control for automobile-motors wherein in certain running positions of the controller a shunt containing a resistance is placed about the field-windings. It is evident that if for any reason—as, for instance, because of a bad contact—the circuit through the field-windings is opened while the shunt is in position the flow of current through the storage battery and armature is limited only by the ohmic resistance of these elements and of the shunt connection, for the motor is deprived of its field and is therefore unable to set up an electromotive force counter to the storage battery. The resistance which will ordinarily be connected in shunt with the field-windings in order to raise the speed of the motor through weakening its field is insufficient to cut down the current under such abnormal condition to a value whereupon no injury will result to the armature or the battery, or both.

The object of the present invention is to provide means whereby in the system referred to the usual flow of current may take place through the motor so long as the field remains energized; but in case the field-circuit is interrupted while in parallel with a resistance the motor-circuit will be broken.

It is well known that when an automobile-motor is accelerating from a position of rest or when heavily loaded a current many times greater than the normal current may flow through the motor and battery for a short time. If this same current were allowed to flow under the abnormal condition of no field excitation, the armature and battery might be irreparably injured before the opening of the circuit.

The present invention therefore contemplates means which shall not interfere with the operation of the motor when taking a large current when accelerating or heavily loaded, but which will interrupt the circuit under the abnormal condition while the current is yet comparatively small.

The present invention will be more fully understood in connection with the following description thereof.

In the accompanying drawings, Figure 1 illustrates diagrammatically a control system embodying the present invention, and Figs. 2 to 5 indicate the circuit conditions corresponding to certain running positions of the controller.

Reference being had to Fig. 1, A indicates the motor-armature, and F and F' series field-windings. B is the storage battery which supplies the motor with current. R is a resistance, and C is a controller. The controller is arranged to connect the motor for both forward and reverse operation; but only one set of running positions need here be considered. $c$ to $c^7$ are fixed fingers adapted to operate with movable contacts $d$ to $d^{10}$ for forward rotation of the motor and other contacts $e$ to $e^5$ for reverse operattion. When the controller is moved to the first running position, wherein one set of movable contacts engages with the row of fingers along line 1 1, a circuit is completed from one terminal of the battery through the motor-armature, through the resistance R, through contact $c'$, contacts $d'$ and $d^2$, field-winding F, contact $c^4$, contacts $d^5$, $d^3$, and $c^3$, field-winding F', contact $c^6$, and thence to the opposite terminal of the battery through contacts $d^8$ $d^7$ $c^5$. In the second position of the controller no change is produced, except that the resistance R is short-circuited at contacts $c$ $c'$ $d$ $d'$ and the motor is connected directly to the terminals of the battery, as shown in Fig. 2. In position 3 of the controller contact $d^9$ engages with finger $c^7$, and the current after it leaves the armature passes in part through section $r$ of resistance R, through contacts $c^7$, $d^9$, $d^8$, $d^7$, and $c^5$, to the battery, instead of passing wholly through the field-windings after leaving the armature. The circuit connections are now as indicated in Fig. 3.

It is evident that if contact $d^3$ should become insulated from finger $c^3$ or if contact $d^5$ should become insulated from contact $c^4$ by reason of dirt or oxidation or because of improper adjustments opening the field-circuit the battery will become short-circuited through the resistance $r$ and the armature. Since the armature can no longer generate an electromotive force counter to the battery, it would take but a short time to do serious injury to the battery and motor were this condition allowed to remain. In order to prevent the passage of current through the motor and the battery when the motor is without field, I have arranged in the shunt, including resistance $r$, a fuse $f$ of such a character that it easily carries the currents which flow through the shunt when a portion of the total current is flowing through the field-windings. Should, however, the field-circuit be interrupted, the entire current will flow through the shunt, which then carries a current much in excess of that intended, and the fuse $f$ immediately blows out and interrupts the entire circuit.

By placing the fuse in the shunt connection instead of in the main circuit the current value at which the circuit is interrupted under abnormal conditions may be such that no serious effect is produced upon the battery or motor-armature, while if the fuse were placed in the main circuit it would have to be designed to carry a maximum current which may momentarily be used in accelerating, and the circuit would, perhaps, not be interrupted until damage had been done. Another advantage arising from placing the fuse in the shunt-circuit is that although the motor may be inoperative in the running positions of the controller wherein the shunt is employed, yet it may be operated in other positions of the controller without replacing the fuse, provided, of course, that the defect in the field connection is remedied or that the defect is such as not to prevent the completion of a main circuit in some position of the controller.

In Figs. 4 and 5 are shown the circuit connections when the controller is in its fourth and fifth running positions, respectively. The protective device, it is seen, comes into play in the final running position, (shown in Fig. 5,) wherein the two field-windings instead of being in series are in parallel and also in parallel with the resistance $r$.

The particular form of motor and control system illustrated is not essential to the present invention, which may be employed in systems of various types and different forms of series motors.

What I claim as new, and desire to secure by Letters Patent of the United States, is—

1. In a system of control, a motor, a source of current-supply, means for connecting said motor to said source of supply, means for placing a shunt about the motor field-winding, and means operative under less than normal current to interrupt the armature-circuit when the field-circuit is deënergized while the shunt remains energized.

2. In a system of control, a storage battery, a motor operatively connected to said battery, a resistance connected in parallel with the motor field-winding, and means for interrupting the circuit from the battery when the circuit through the field is interrupted without a corresponding interruption of the circuit through said resistance.

3. In a system of control, a storage battery, a series motor operatively connected therewith, a resistance connected in parallel with the field-winding of said motor, and means for interrupting the circuit from the battery when the circuit including the field-winding is interrupted without a corresponding interruption of the circuit including said resistance, said means being arranged to operate under current having a value lower than usual working currents.

4. In a system of control, a storage battery, a series motor connected thereto, a resistance connected in parallel with the field-winding of said motor, and means in the connection containing the resistance for interrupting the circuit from the battery upon an interruption of the circuit including the field-winding without a corresponding interruption of the circuit including the resistance.

5. In a system of control, a storage battery, a series motor connected thereto, a resistance in parallel with the field-winding of said motor, and a fuse in the connection containing the resistance, said fuse being arranged to act upon the passage of a current lower than usual working currents through the motor-armature.

6. In a system of control, a source of current-supply, a motor, a resistance, a controller arranged to connect said motor to said source of supply and in certain positions of the controller to shunt the field-winding through said resistance, and a fuse in the connection between the resistance and the controller, said fuse being arranged to act when the current passing therethrough reaches a predetermined value which is lower than usual working currents.

In witness whereof I have hereunto set my hand this 9th day of June, 1905.

ALEXANDER CHURCHWARD.

Witnesses:
BENJAMIN B. HULL,
HELEN ORFORD.